July 6, 1948.  R. HAPPE  2,444,826
BRUSH ASSEMBLIES FOR DYNAMOELECTRIC MACHINES
Filed April 23, 1945
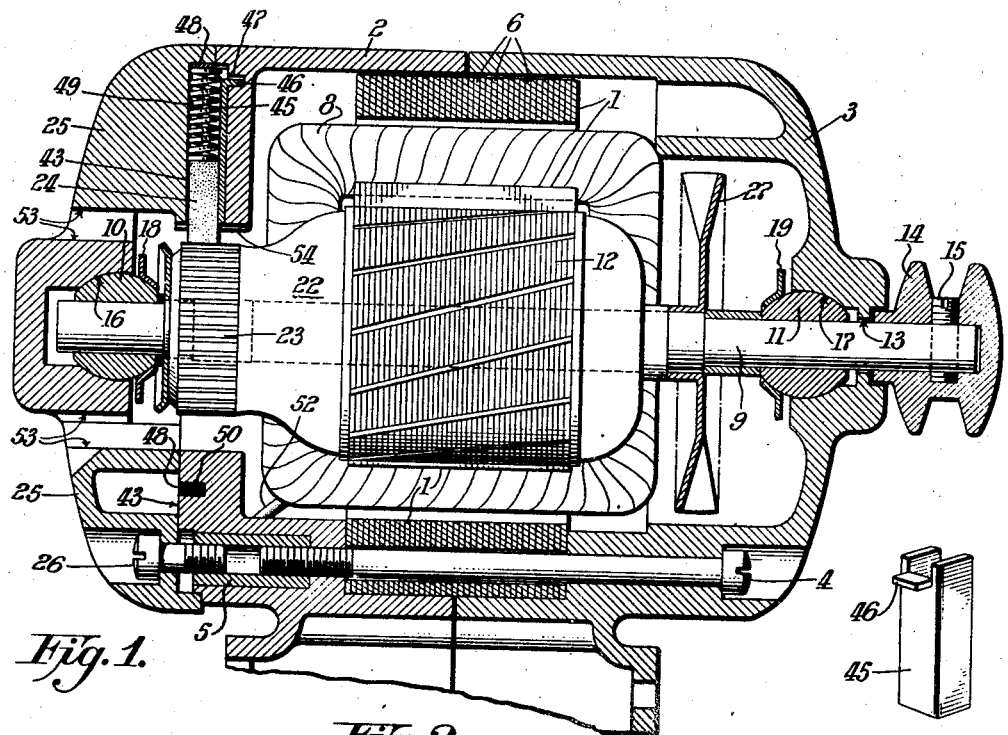
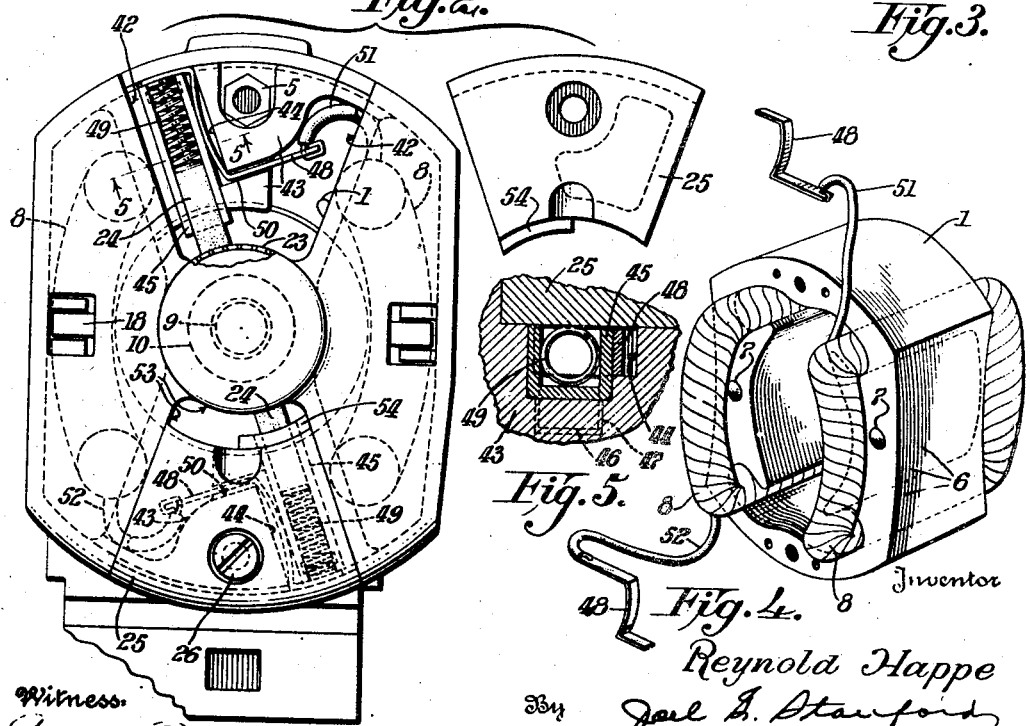
Inventor
Reynold Happe Patented July 6, 1948

2,444,826

UNITED STATES PATENT OFFICE 2,444,826

BRUSH ASSEMBLY FOR DYNAMOELECTRIC MACHINES

Reynold Happe, Pittstown, N. J., assignor to The Singer Manufacturing Company, Elizabeth, N. J., a corporation of New Jersey Application April 23, 1945, Serial No. 589,846

10 Claims. (Cl. 171—252)

This invention relates to dynamoelectric machines and more particularly to brush holder structures for small electric motors adapted to furnish the driving power for sewing machines, typewriters, fans and similar apparatus.

These small motors are produced in very large quantities and the desirable brush assembly should, therefore, be simple, inexpensive, easy to assemble, and yet rugged and able to withstand rough usage.

Heretofore, in motors of this type, it has been customary for the brushes to be held within conducting brush holders which enclose said brushes, the brush holders being either secured within suitable radial, insulated recesses in the motor case or attached to a suitable interior insulated brush plate, secured under one of the end-covers. In the former case, the proper fit of the brushes upon the commutator cannot be observed since the assembly is blind; nor can the remaining allowable wearing-length of brush be determined without removing said brush from its holder. In the latter case, it is generally necessary to remove an end-cover to expose the brush plate, which means that the bearing alignment must be disturbed. Further, in both cases the actual seating and "running-in" of new brushes cannot be observed, and this is a serious limitation where long brush life is important.

It is, therefore, an object of this invention to provide an improved brush assembly for small motors which shall be simple, inexpensive and rugged, and in which the brushes shall be fully accessible for inspection and replacement and the "running-in" condition thereof is readily determinable without disturbing any bearing alignments.

This has been obtained by a novel construction, in which an open-sided brush holder of the box type is held within a radial recess in a molded end-cover by a special spring element which serves both as a mechanical securing means for said brush holder and as an electrical connecting means for a brush held within said brush holder by a removable insulating cover-piece secured against the open side of said brush holder and positioned within a suitable seating recess in said molded end-cover.

With the above and other objects in view, as will hereinafter appear, the invention comprises the devices, combinations, and arrangements of parts hereinafter set forth and illustrated in the accompanying drawings of a preferred embodiment of the invention from which the several features thereof and the advantages attained thereby will be readily understood by those skilled in the art.

In the accompanying drawings, Fig. 1 is a longitudinal sectional view taken through an electric motor embodying the invention. Fig. 2 is an end elevational view of the motor of Fig. 1 showing one of the brush covers removed. Fig. 3 is a detail perspective view of a brush holder used in the motor of Fig. 1. Fig. 4 is a detail perspective view of a stator core assembly used in the motor of Fig. 1. Fig. 5 is a transverse sectional view taken on line 5—5, Fig. 2.

The motor is constructed with a stator core 1 held in clamped relation between end-covers 2 and 3, preferably of molded insulation material, by means of screws 4 which extend longitudinally through the parts and are threaded into bushings 5—5 removably carried in recesses in the end-cover 2. The stator core 1 is made up of thin stacked magnetic laminations 6 held together by rivets 7 and carries current-conducting field coil windings 8 thereon as is well known in the art. A shaft 9 journaled in self-aligning bearings 10 and 11 carries a rotor core 12 which is mounted for rotation in the usual manner within the stator core 1. The shaft 9 extends through an aperture 13 in the end-cover 3 and has a power take-off pulley 14 secured to its outer end by means of screw 15.

The bearings 10 and 11 are held within spherical seats 16 and 17 respectively in end-covers 2 and 3 by spring retainers 18 and 19. This bearing construction forms the subject matter of the copending application Serial No. 589,779 of Edgar P. Turner, filed April 23, 1945, to which reference may be had for a more complete description thereof.

The rotor core 12 carries the usual current-conducting winding 22 connected to commutator 23 in the conventional manner. A fan 27 pressed onto a portion of the shaft 9 rotates therewith to cause ventilating air to be circulated longitudinally through the motor, as is customary with motors of this type.

For a more complete description of this motor construction, particularly of the case and core assembly, reference may be had to the copending application Serial No. 589,778 of Edgar P. Turner, filed April 23, 1945.

According to the present invention, end-cover 2 is formed with a heavy end-wall section 42 from which two diametrically opposite sector elements have been removed to a depth of approximately half the wall thickness. The back walls 43—43 exposed by this removal are each formed with radially-disposed recesses 44—44, each having a rectangular cross section. Within these recesses 44—44, and flush with the respective back walls 43—43 are positioned three-sided conducting brush-holders 45—45 with their open sides exposed. Each brush holder is formed, as shown in Fig. 3, with a depending portion 46 which seats within the respective recess 47 so that each brush holder is thereby indexed for proper radial clearance relative to the commutator 23.

Brushes 24—24 positioned within the brush-holders bear against diametrically opposite portions of the commutator 23 to permit transfer thereto of current, as is well known in the art. Also positioned within the recesses 44—44 are leaf spring conductor elements 48—48, preferably of phosphor bronze or beryllium copper, each bent into a general Z-shape with the top limb of the Z preferably closing over the outer end of the brush holder. Within each brush holder is a compression spring 49 for exerting a radially inward thrust on the respective brushes to urge them into electrical contact with the commutator 23. The middle stem portions of the spring conductor elements 48—48 are bowed and compressed to extend lengthwise of and between the lateral walls of the recesses 44—44 and the respective brush holder to urge said brush holder firmly against the opposite wall of the respective recess as seen best in Fig. 2. Narrower recesses 50—50 intersect the respective first-mentioned recesses 44—44 transversely and serve to house the lower straight limb portions of the respective Z-shaped spring conductors 48—48 which terminate within the motor where they connect with leads 51 and 52 from the field coil windings 8. Removable brush covers 25—25, preferably of molded insulating material, are provided and each fits over the respective brush assembly to form the side closure for the brush holder; said covers being removably secured by screws 26—26, respectively threaded into the removable bushings 5—5 in the end-cover 2 to lie flush with the exposed wall thereof.

This construction lends itself very well to a simple but rugged assembly of parts. For example, the stator core assembly is provided, as shown in Fig. 4, with each of the spring conductors 48—48 soldered to the end of a respective one of the leads 51 and 52 to the field coil windings. Thus, when the stator core assembly is to be assembled with the end-covers, these field-coil leads are simply pulled through the end-cover apertures and the bowed portion of the spring conductors are compressed and forced into the respective recesses to bear against the respective brush holders, the frictional forces set up thereby holding everything in proper position. The brush 24 and compression spring 49 are inserted through the open side of each brush holder. In this position the brush assembly is exposed in its true working condition and the motor may be operated with the brush covers removed. Thus, the important considerations such as "running in," brush fit, and wearing depth may be readily observed. When the brush covers are in place, all elements are securely held in place, the covers serving as the fourth and closing side of the brush holders. It is understood that, in this condition, the brushes are free to move radially within the holders and, urged by the compression springs, said brushes seat fully against the commutator surface at all times.

When in position, the brush covers 25—25 do not extend radially all the way inwardly to the hub portion of the end-cover, but are spaced therefrom to provide thereby ventilating openings 53—53 through which cooling air may enter or leave the motor in close proximity to the commutator 23. Further, the brush covers 25—25 are each formed with respective lip portions 54—54 which serve merely to cover the inner ends of the brush holders without appreciably decreasing the effective area of the ventilating openings 53—53.

The brush covers are so seated as to provide flush external surfaces and thus produce in the commutator end-cover itself the pleasing symmetrical appearance of a single integral piece precisely like that of the opposite or pulley end-cover which is, in fact, made of one piece.

It will be obvious to those skilled in the art that the invention may, without departure from its essential attributes, be embodied in various specific forms other than that shown and described, which latter is to be considered in all respects as illustrative of the invention and not restrictive.

Having thus set forth the nature of the invention, what I claim herein is:

1. In a dynamoelectric machine, an end-cover, a brush holder recessed within said end-cover and having an open side, a brush seated within said holder and having an exposed side, and a closure element of insulating material removably secured to said end-cover to close the open side of said brush holder to retain said brush therein, a portion of said closure element being, when in place, spaced from a portion of said end-cover to provide an opening through which air may enter or leave said machine.

2. In a dynamoelectric machine, an end-cover of molded insulating material, a brush recessed within said end-cover and having an exposed side, and a closure element of molded insulating material removably secured to said end-cover to cover the exposed side of said brush, a portion of said closure element being, when in place, spaced from a portion of said end-cover to provide a ventilating opening for said machine.

3. In a dynamoelectric machine, an end-cover, a brush holder recessed within a radial groove in said end-cover and having an open side, a brush held within said brush holder and exposed on said open side, and a closure element removably secured to said end-cover to cover the exposed side of said brush, said closure element being, when in place, spaced from said brush so that the brush is free to move radially within the brush holder.

4. In a dynamoelectric machine having a commutator, an end-cover, a brush holder recessed within a radial groove in said end-cover and having an open side, a brush held within said brush holder and exposed on said open side, a closure element removably secured to said end-cover to cover the exposed side of said brush, said closure element, being, when in place, spaced from said brush so that the brush is free to move radially within the brush holder, and means for resiliently urging said brush against said commutator.

5. In a dynamoelectric machine, a stator core, a current-carrying winding on said core, an end-cover having a radially-disposed, recessed portion, a brush holder having an open side and positioned within said recessed portion with said open side exposed, a spring conductor positioned within said recessed portion in compressed condition between said brush holder and a wall of said recessed portion and electrically connected to said current-carrying winding, a brush surmounted at one end by a spring positioned within said brush holder to urge said brush endwise and radially inward, and a brush-cover removably secured to said end-cover and positioned against the open side of said brush holder to cover said exposed brush.

6. In a dynamoelectric machine, a commutator, a stator core, a current-carrying winding on said core, an end-cover having a radially-disposed, recessed portion, a conducting brush holder having an open side and positioned within said recessed portion with said open side exposed, a bowed spring conductor positioned within said recessed portion in compressed condition between said brush holder and a wall of said recessed portion and electrically connected to said current-carrying winding, a brush surmounted at one end by a compressed spring positioned within said brush holder to urge said brush endwise and radially inward against said commutator, and a brush cover removably secured to said end-cover and positioned against the open side of said brush holder to cover said exposed brush.

7. In a dynamoelectric machine, a stator core, a current-carrying winding on said core, an end-cover having a radially-disposed, recessed portion, a brush holder having an open side and positioned within said recessed portion with said open side exposed, a spring conductor positioned within said recessed portion in compressed condition between said brush holder and a wall of said recessed portion and electrically connected to said current-carrying winding, a brush surmounted at one end by a spring positioned within said brush holder to urge said brush endwise and radially inward, and a brush-cover removably secured to said end-cover and positioned against the open side of said brush holder to cover said exposed brush, a portion of said brush-cover being, when in place, spaced from a portion of said end-cover to provide a ventilating opening for said machine.

8. In a dynamoelectric machine, a stator core, a current-carrying winding on said core, an end-cover provided with a recessed wall portion having therein a radially-disposed first groove, a second groove intersecting said first groove, a brush holder having an open side and positioned within said first groove with said open side exposed, a spring conductor positioned with a bowed portion thereof located within said first groove in compressed condition between said brush holder and a wall of said first groove and with a straight portion thereof located in said second groove and electrically connected to said current-carrying winding, a brush having at one end a spring positioned within said brush holder to urge said brush endwise and radially inward, and a brush-cover removably secured to said end-cover and positioned against the open side of said brush holder to cover said exposed brush and the recessed wall portion of said end-cover.

9. In a dynamoelectric machine, a commutator, a stator core, a current-carrying winding on said core, an end-cover having in a wall portion thereof a radially-disposed recess, a brush holder having an open side and positioned within said recess with said open side exposed and substantially flush with said wall portion, a spring conductor with a bowed portion thereof positioned within said recess, said spring conductor being compressed between said brush holder and a wall of said recess and electrically connected to said current-carrying winding, a conducting brush surmounted at one end by a spring positioned within said brush holder to urge said brush endwise and radially inward against said commutator, and a brush-cover removably secured to said end-cover and positioned against the wall portion thereof to form a cover which, when in place, closes the open side of said brush holder.

10. In a dynamoelectric machine, a stator core, a current-carrying winding on said core, an end-cover having a radially-disposed recessed portion, a conducting brush holder positioned within said recessed portion, and a flat spring conductor positioned within said recessed portion in compressed condition between said brush holder and a side wall of said recessed portion and electrically connected to said current-carrying winding.

REYNOLD HAPPE.

REFERENCES CITED

The following references are of record in the file of this patent:

UNITED STATES PATENTS

| Number | Name | Date |
| --- | --- | --- |
| 2,246,270 | Staak | June 17, 1941 |

FOREIGN PATENTS

| Number | Country | Date |
| --- | --- | --- |
| 525,855 | Germany | May 29, 1931 |